United States Patent
Zeng et al.

(10) Patent No.: US 7,352,893 B2
(45) Date of Patent: Apr. 1, 2008

(54) REPRESENTING EXTENDED COLOR GAMUT INFORMATION

(75) Inventors: Huanzhao Zeng, Vancouver, WA (US); Kevin R. Hudson, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 935 days.

(21) Appl. No.: 10/615,860

(22) Filed: Jul. 9, 2003

(65) Prior Publication Data

US 2005/0008223 A1    Jan. 13, 2005

(51) Int. Cl.
| | |
|---|---|
| G06K 9/00 | (2006.01) |
| G09G 1/28 | (2006.01) |
| G09G 3/28 | (2006.01) |
| G09G 5/00 | (2006.01) |
| H04N 1/46 | (2006.01) |
| G03F 3/10 | (2006.01) |

(52) U.S. Cl. .................. 382/162; 345/589; 345/643; 345/22; 345/72; 345/83; 358/515; 358/518

(58) Field of Classification Search ........ 382/162–167; 345/589–593, 600–601, 605, 643, 549, 22, 345/72, 83, 153, 155; 358/515, 518
See application file for complete search history.

(56) References Cited

U.S. PATENT DOCUMENTS

| | | | | |
|---|---|---|---|---|
| 4,789,892 | A | * | 12/1988 | Tsuzuki et al. ............. 358/517 |
| 4,821,208 | A | * | 4/1989 | Ryan et al. ................. 345/550 |
| 4,994,901 | A | | 2/1991 | Parulski et al. |
| 5,109,273 | A | * | 4/1992 | Parulski et al. ............. 358/524 |
| 5,285,271 | A | * | 2/1994 | Gennetten .................. 358/500 |
| 5,488,672 | A | * | 1/1996 | Mita .......................... 382/167 |
| 5,588,050 | A | * | 12/1996 | Kagawa et al. ............. 382/167 |
| 5,719,689 | A | * | 2/1998 | Terada ....................... 358/529 |
| 5,764,796 | A | * | 6/1998 | Smith ........................ 382/167 |
| 5,995,655 | A | * | 11/1999 | Lockett et al. ............. 382/162 |

(Continued)

FOREIGN PATENT DOCUMENTS

EP    0501942 A1    9/1992

(Continued)

OTHER PUBLICATIONS

Matthew Anderson, Ricardo Motta, et al., "Proposal for a Standard Default Color Space for the Internet—sRGB," Proceedings of the Fourth Color Imaging Conference, pp. 238-245 (1996).

(Continued)

*Primary Examiner*—Jingge Wu
*Assistant Examiner*—Manav Seth

(57) ABSTRACT

A computer-readable medium of one embodiment of the invention is disclosed that has a data structure stored thereon to represent extended color gamut information for a pixel. The data structure has a number of data fields, where each data field is to store a number of bits representing a different color component of the pixel. The data structure also has at least one interpretation bit for each data field to indicate how the bits of the data field are to be interpreted in representing the different color component of the pixel.

15 Claims, 10 Drawing Sheets

U.S. PATENT DOCUMENTS

| | | | |
|---|---|---|---|
| 6,335,983 B1 | 1/2002 | McCarthy et al. | |
| 6,487,308 B1* | 11/2002 | Ulichney et al. | 382/162 |
| 6,611,274 B1* | 8/2003 | Keely et al. | 345/600 |

FOREIGN PATENT DOCUMENTS

| | | |
|---|---|---|
| EP | 1197917 A2 | 4/2002 |
| JP | 04288684 A | 10/1992 |
| JP | 2000261679 A | 9/2000 |
| WO | WO-0117233 A1 | 3/2001 |

OTHER PUBLICATIONS

Photography—Electronic still picture imaging—Extended sRGB color encoding—e-sRGB, Photographic and Imaging Manufacturers Association, Inc. (PIMA) 7667, Working Draft 1.9, Nov. 14, 2000.

Japanese search report in corresponding Japan case, dated Oct. 23, 2006.

European search report in corresponding European case, dated Nov. 22, 2006.

"ITU-T White Book digital still image compression encoding relation recommendation report," Jan. 25, 1994, pp. 21 & 46-47.

* cited by examiner

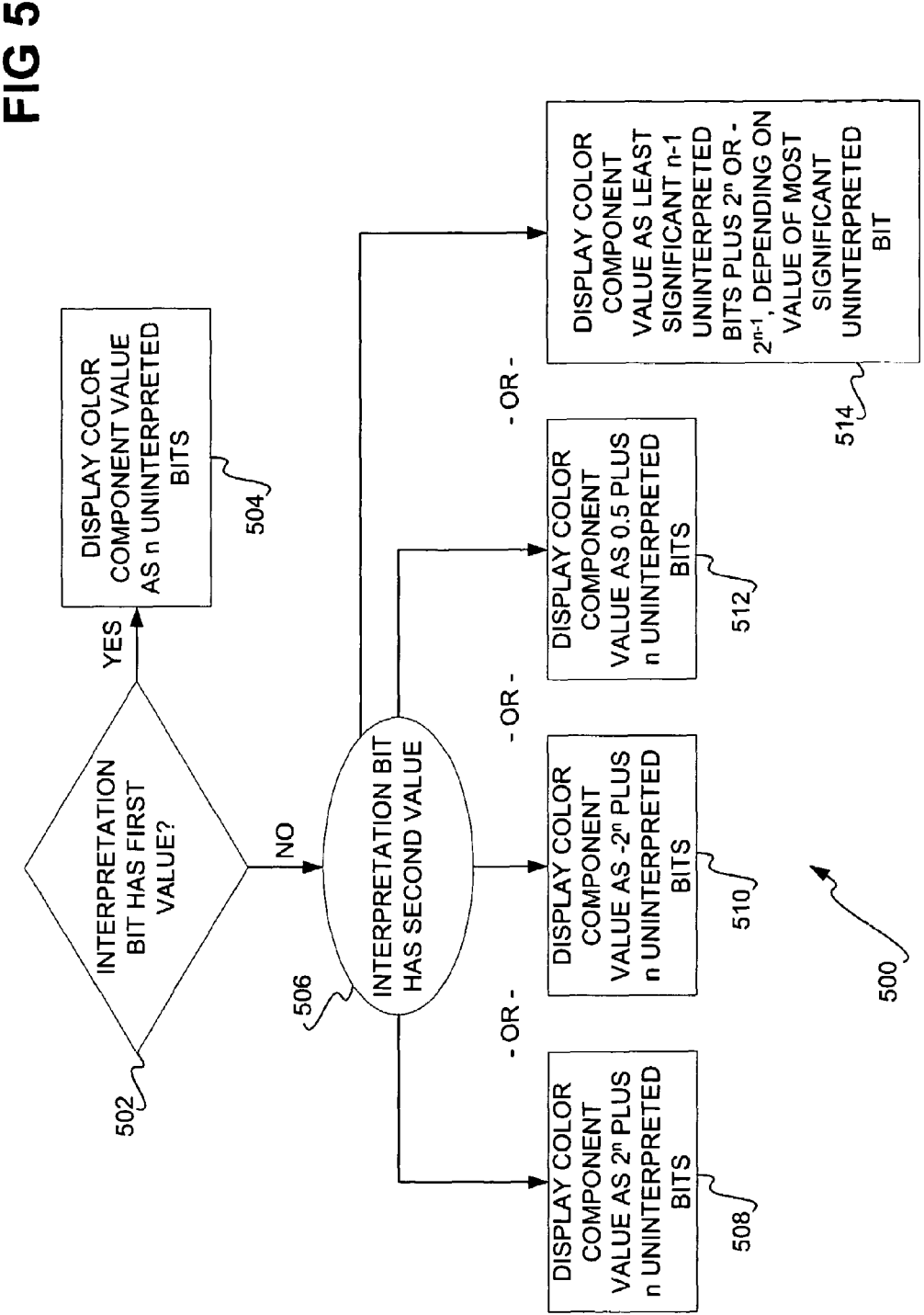

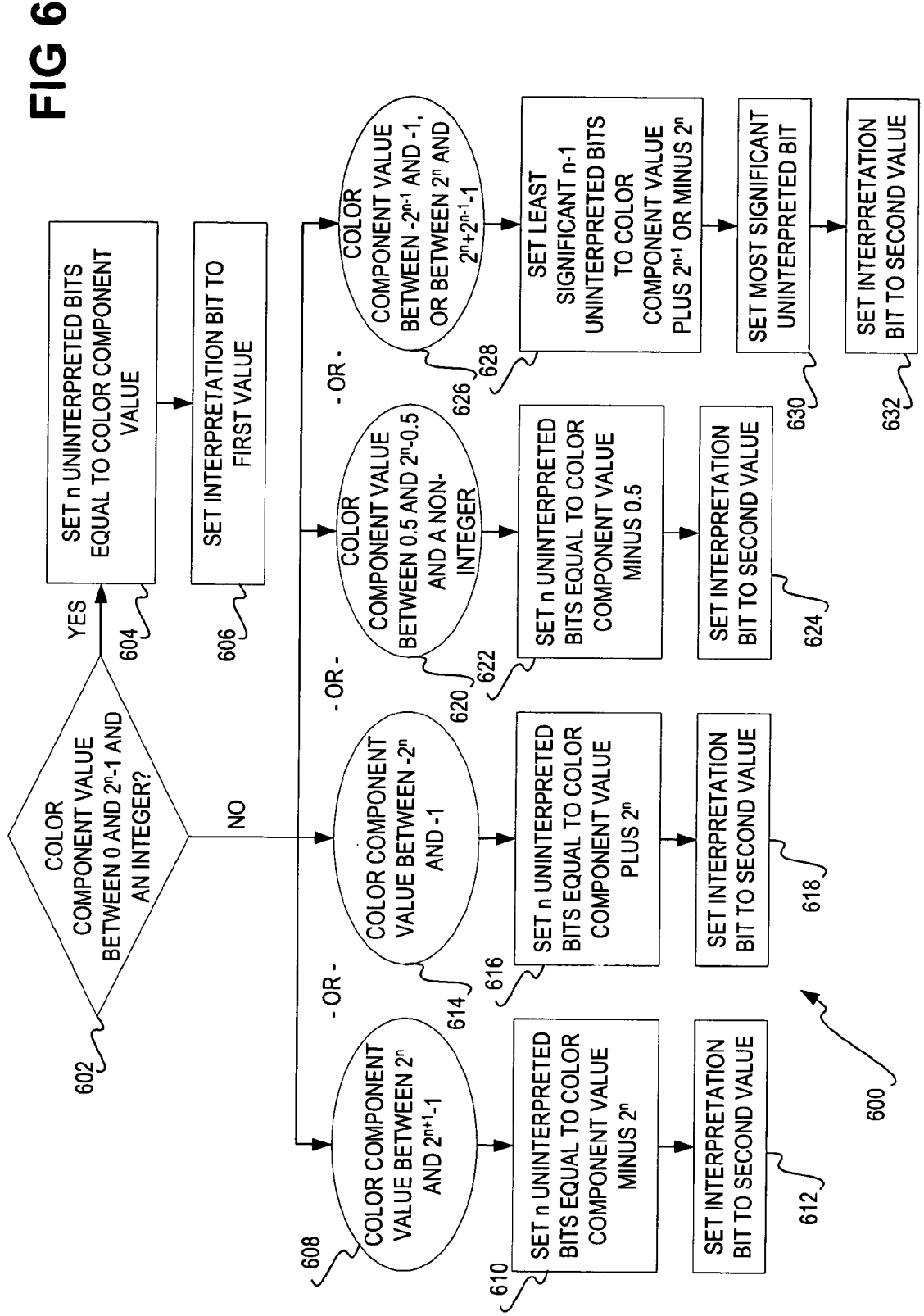

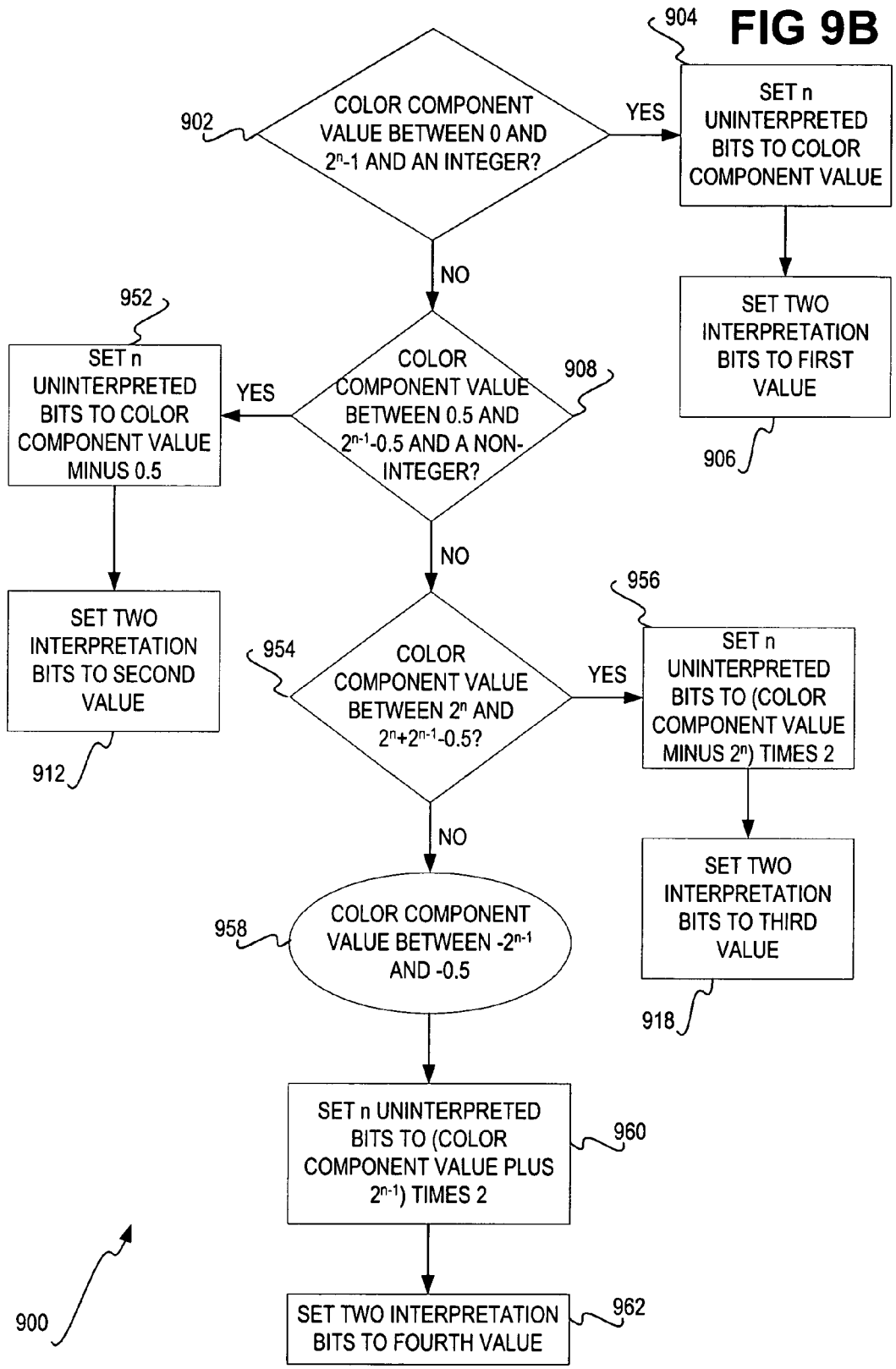

REPRESENTING EXTENDED COLOR GAMUT INFORMATION

BACKGROUND

Color gamut refers to the range of colors that can be output by a device, and color space refers to the color model used to represent colors that can be output by the device. For example, the color gamut of a display device refers to the range of colors that can be displayed by the display. Display devices commonly employ the red-green-blue (RGB) color space, in which each color is represented as a combination of a red color component, a green color component, and a blue color component.

The colors that can be output by a device having a particular color space is equal to $2^{n \times m}$, where m is the number of color components, or channels, of the color space, and n is the number of bits used to represent the value of each channel. For example, for a display device using the RGB color space in which each color component has 8 bits, the value of each color component can be any one of $2^8=256$ different values, such that $256^3=16,777,216$ different true colors can be represented.

To increase, or extend, the color gamut for a particular color space, or to increase the accuracy to represent color values, the number of bits, or the bit depth, of each color channel is typically increased. However, increasing the bit depth of a color space's channels significantly increases memory or storage space requirements. For example, an 8-bit per-channel RGB color space image file uses 24 bits to represent a pixel, whereas a 12-bit per-channel RGB color space image file uses 36 bits to represent a pixel. Increasing the bit depth of an RGB color space from 8 bits to 12 bits thus results in a 50% increase in the amount of memory or storage space needed.

SUMMARY

A computer-readable medium of one embodiment of the invention has a data structure stored thereon to represent extended color gamut information for a pixel. The data structure has a number of data fields, where each data field is to store a number of bits representing a different color component of the pixel. The data structure also has at least one interpretation bit for each data field to indicate how the bits of the data field are to be interpreted in representing the different color component of the pixel.

BRIEF DESCRIPTION OF THE DRAWINGS

The drawings referenced herein form a part of the specification. Features shown in the drawing are meant as illustrative of only some embodiments of the invention, and not of all embodiments of the invention, unless explicitly indicated, and implications to the contrary are otherwise not to be made.

FIG. 5 is a flowchart of a method for displaying a color component value of a pixel that has an uninterpreted value and one interpretation bit for the color component, according to an embodiment of the invention.

FIG. 6 is a flowchart of a method for encoding a color component value of a pixel into an uninterpreted value and one interpretation bit for the color component, according to an embodiment of the invention.

FIGS. 9A and 9B are flowcharts of methods for encoding a color component value of a pixel into an uninterpreted value and two interpretation bits for the color component, according to varying embodiments of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

OVERVIEW

Figure 1:
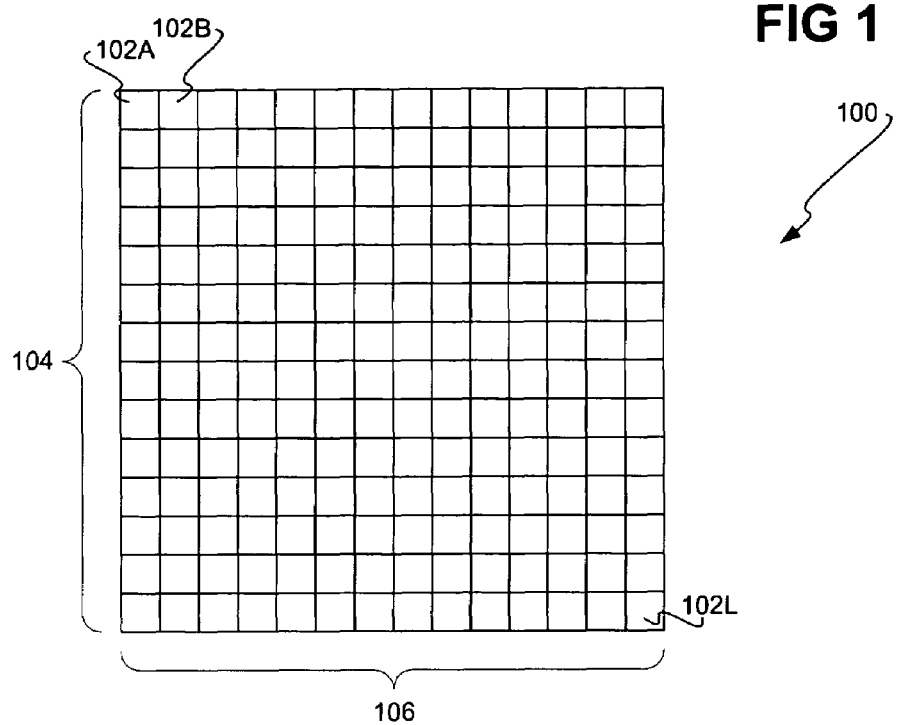
FIG. 1 is a diagram illustratively depicting a data structure of an image having a number of pixels, according to an embodiment of the invention.

FIG. 1 illustratively shows an image 100, according to an embodiment of the invention. The image 100 may be represented as a data structure, and may be stored as a data file on a computer-readable medium. The computer-readable medium may be a volatile or a non-volatile medium. The computer-readable medium may also be a semiconductor medium, such as a semiconductor memory, an optical medium, such as a compact disc (CD)-type medium or a digital versatile disc (DVD)-type medium, and/or a magnetic medium, such as a hard disk drive, a floppy disk, or a tape cartridge.

The image 100 has a number of pixels 102A, 102B, . . . , 102L, collectively referred to as the pixels 102. A pixel is a picture element, which is a small, addressable unit of the image 100. The pixels 102 are depicted in FIG. 1 as being organized within a number of rows 104 and a number of columns 106. However, the pixels 102 may be organized in other ways as well. The collection of the pixels 102 thus makes up the image 100. The number of pixels 102 is referred to as I. The number of rows 104 multiplied by the number of columns 106 therefore equals I.

Figure 2:
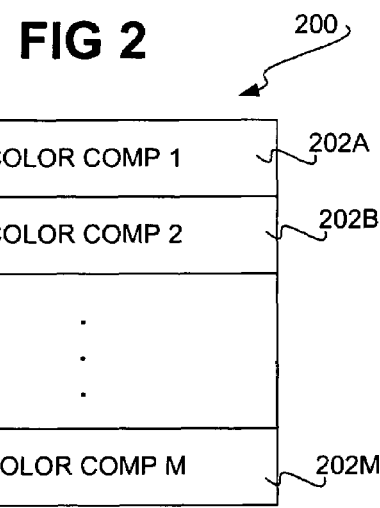
FIG. 2 is a diagram of a data structure of a pixel of the image of FIG. 1 that has a number of color components, according to an embodiment of the invention

FIG. 2 shows a data structure for a representative pixel 200, according to an embodiment of the invention. The pixel 200 exemplifies any of the pixels 102 of the image 100 of FIG. 1. The pixel 200 has color component, or color channel, data for a number of color components 202A, 202B, . . . 202M, collectively referred to as the color components 202. The number of color components 202 is referred to as m. For instance, m may equal 3 where the red-green-blue (RGB) color space, having red, green, and blue color channels, is used. Other color spaces that may be employed include the cyan-magenta-yellow-black (CMYK) color space, the lightness (L)-redness/greenness (A)-yellowness/blueness(B) (LAB) color space, the luminance (Y)-blue color difference (Cb)-red color difference ($C_r$) ($YC_bC_r$, or YUV, or YCC) color space, the hue-saturation-value (HSV) color space, and the hue-saturation-brightness (HSB) color space, among others.

Figure 3:
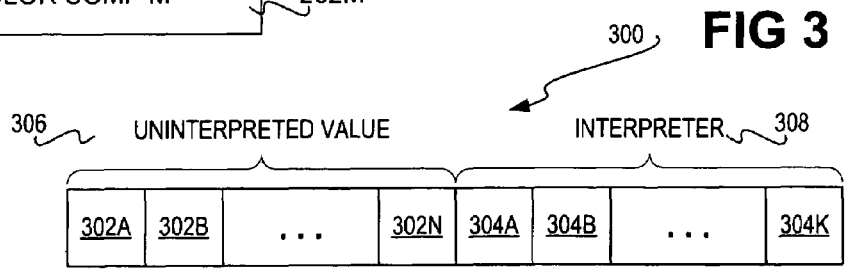
FIG. 3 is a diagram of a data structure of a color component of the pixel of FIG. 2 that has a value and at least one interpretation bit, according to an embodiment of the invention.

FIG. 3 shows a data structure or a data field for a representative color component 300, according to an embodiment of the invention. The color component 300 exemplifies any of the color components 202 of the pixel 200 of FIG. 2. The color component 300 has two parts: an uninterpreted value 306, and an interpreter 308. The uninterpreted value 306 is uninterpreted in the sense that the interpreter 308 is used to interpret the value 306. The uninterpreted value 306 has a number of uninterpreted bits 302A, 302B, . . . , 302N, collectively referred to as the uninterpreted bits 302 of the color component 300, whereas the interpreter 308 has at least one interpretation bit 304A, 304B, . . . , 304K, collectively referred to as the interpretation bits 304 of the color component 300. The uninterpreted bits 302 are uninterpreted in the sense that the interpretation bits 304 are used to interpret the bits 302. The number of bits 302 is referred to as n, whereas the number of the at least one interpretation bit 304 is referred to as k. For example, n may equal 8 or another number, whereas k may equal 1, 2, 3, or another number.

The value of the bits 302 of the color component 300 is interpreted differently, based on the value of the interpretation bits 304 of the color component 300. Where n is equal to 8, the bits 302 can have $2^8=256$ different values, and where k is equal to 2, the interpretation bits 304 can have $2^2=4$ different values. This means that the value of the bits 302 of the color component 300 can be interpreted in four different ways, depending on the value of the interpretation bits 304, allowing for up to $4 \times 256=1,024$ different color values of the component 300. One interpretation of the value of the bits 302 is that the value of the bits 302 directly represents the color value of the color component 300. For example, where the bits 302 have a value of 200, the color value of the component 300 is 200. Specific interpretations according to varying embodiments of the invention where k equals 1 or 2 are described in subsequent sections of the detailed description.

In software implementations, eight bits (n=8), or one byte, is typically used to encode a color component for images. The 8-bit representation may not be able to encode a device gamut sufficiently or accurately. Extending the bit-depth to sixteen bits (n=16), or two bits, is usually sufficient; however, the memory usage is doubled. Using the combination of a number of uninterpreted bits (n) and a small number of interpretation bits (k) to encode a color component, efficiently extends the color gamut or the color accuracy of the color space of which the color component 300 is a part.

The terminology "increasing or extending the color gamut" or "increasing or extending the color range," as used in particular relation to the claim language and for detailing particular advantages of embodiments of the invention, is also inclusive of the terminology "increasing color accuracy" or the terminology "increasing color precision." For instance, for n uninterpreted bits, the k interpretation bits can be used to extend the gamut or range of a color component of a pixel below 0 or beyond $2^n-1$. As another example, for n uninterpreted bits, the k interpretation bits can be used to more precisely or accurately specify the values of a color component of a pixel, such as ranging from 0 through $2^n-1$ in fractional increments, like 0.5, instead of in integer increments. As used in particular relation to the claim language, the terminology "increasing or extending the color gamut or range" is thus inclusive of both of these example situations.

In one embodiment, the RGB color space is used, and there are eight of the bits 302 for each of the red, green, and blue color channels. There may be one or two of the interpretation bits 304 for each of these channels. Where one interpretation bit is used for each channel, the color value of the pixel 200 is encoded with a total of $m=3 \times (n=8+k=1)=27$ bits. Where two interpretation bits are used for each channel, the color value of the pixel 200 is encoded with a total of $m=3 \times (n=8+k=2)=30$ bits. Alternatively, there may be three of the interpretation bits 304 for two of the channels, and two of the interpretation bits 304 for the remaining channel. The color value of the pixel 200 is thus encoded with a total of $2 \times (n=8+k=3)+1 \times (n=8+k=2)=32$ bits. That is, an eight-bit byte is used to store the interpretation bits for all of three channels.

Representing extended color gamut information with one interpretation bit

FIGS. 4A, 4B, 4C, and 4D illustratively show the color gamut range for a color component, or channel, of a pixel, in which there are eight uninterpreted bits and one interpretation bit, according to varying embodiments of the invention. More generally, there can be n uninterpreted bits, such that FIGS. 4A, 4B, 4C, and 4D specifically show the case where n=8. The range of color values depicted in FIGS. 4A, 4B, 4C, and 4D may be for the color component 300 of FIG. 3 of the pixel 200 of FIG. 2.

Figure 4A:
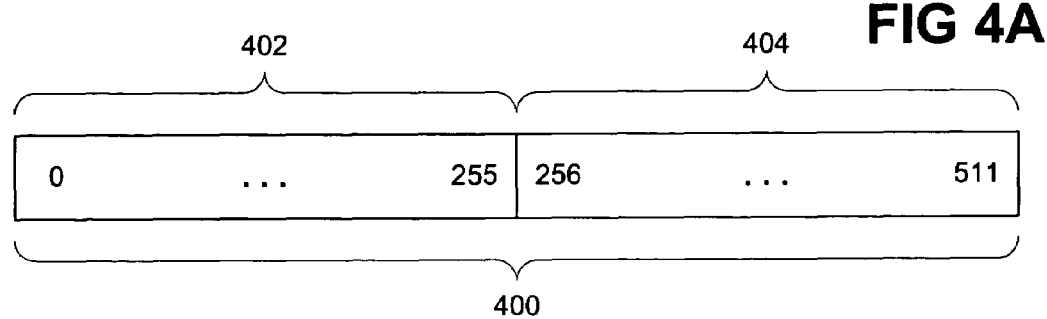
FIGS. 4A, 4B, 4C, and 4D are diagrams depicting the extended color gamut ranges for a color component of a pixel that has an uninterpreted value and one interpretation bit, according to varying embodiments of the invention.

In FIG. 4A, the range of color values 400 is divided into two ranges, the range 402 and the range 404. The range 402 is used where the interpretation bit has a first value, such as zero, and the range 404 is used where the interpretation bit has a second value, such as one. The color value for the color component is equal to the value of the n=8 uninterpreted bits, and thus within the range 402, when the interpretation bit has the first value. The lowest value is 0, the highest value is $2^{n=8}-1=255$, and the range 402 includes all integers between 0 and 255. The color value for the color component is equal to $2^n=256$ plus the value of n=8 uninterpreted bits, and thus within the range 404, when the interpretation bit has the second value. The lowest value is $2^n=256$, the highest value is $2 \times 2^{n=8}-1=511$, and the range 404 includes all integers between 256 and 511. The entire range 400 is therefore between 0 and 511, including all integers between 0 and 511.

For example, the value of the eight uninterpreted bits may be 211. If the interpretation bit is equal to the first value, such as zero, then the color value of the color component is set as 211. If the interpretation bit is equal to the second value, such as one, then the color value of the color component is set as 256+211=457.

More generally, the range 400 allows for integer color values of the color component between 0 and $(2 \times 2^n)-1$. The range 402 is used where the interpretation bit has a first value, and allows for integer color values of the color component between 0 and $2^n-1$. The color value of the color component is specifically set to the value of the n uninterpreted bits. The range 404 is used where the interpretation bit has a second value, and allows for integer color values of the color component between $2^n$ and $(2\times 2^n)-1$. The color value of the color component is specifically set to $2^n$ plus the value of the n uninterpreted bits.

In one embodiment, where a program or process has not been designed to interpret the value of the uninterpreted bits based on the value of the interpretation bit, then the color value of the color component may be set as $2^n-1$ any time the interpretation bit has the second value. Where the second value is one, the interpretation bit can be used in such an embodiment as an overflow bit of the color component, where the device on which the color value of the color component is to be output is an n bit-depth device. Any value greater than $2^n-1$, such that the overflow bit of the color component, which is the interpretation bit, has a value of one, results in a color value of $2^n-1$ actually being output on the n bit-depth device. The highest value of the color component is thus capped at $2^n-1$.

Figure 4B:
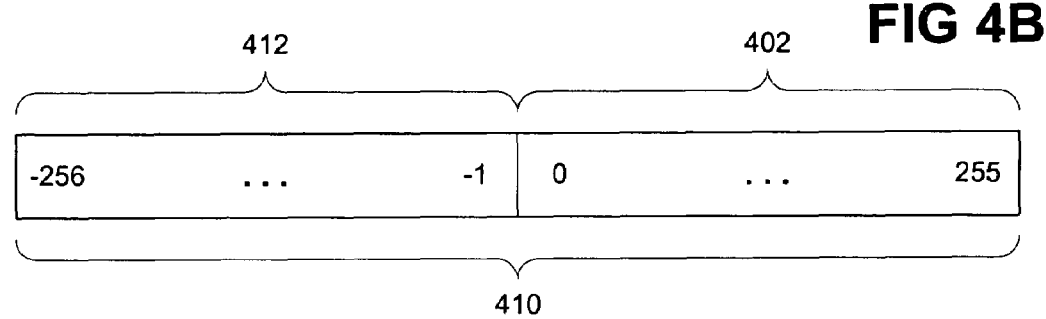

In FIG. 4B, the range of color values 410 is divided into two ranges, the range 402 and the range 412. The range 402 is used where the interpretation bit has a first value, such as zero, and the range 412 is used where the interpretation bit has a second value, such as one. The color value for the color component is equal to the value of the n=8 uninterpreted bits, and thus within the range 402, when the interpretation bit has the first value. The lowest value is 0, the highest value is $2^{n=8}-1=255$, and the range 402 includes all integers between 0 and 255. The color value for the color component is equal to $-2^n$ plus the value of the n=8 uninterpreted bits, and thus within the range 412, when the interpretation bit has the second value. The lowest value is $-2^n=-256$, the highest value is $-1$, and the range 412 includes all integers between $-256$ and $-1$. The entire range 410 is therefore between $-256$ and 255, including all integers between $-256$ and 255.

For example, the value of the eight uninterpreted bits may be 211. If the interpretation bit is equal to the first value, such as zero, then the color value of the color component is set as 211. If the interpretation bit is equal to the second value, such as one, then the color value of the color component is set as $-256$ plus $211=-45$.

More generally, the range 410 allows for integer color values of the color component between $-2^n$ and $2^n-1$. The range 402 is used where the interpretation bit has a first value, and allows for integer color values of the color component between 0 and $2^n-1$. The color value of the color component is specifically set to the value of the n uninterpreted bits. The range 412 is used where the interpretation bit has a second value, and allows for integer color values of the color component between $-2^n$ and $-1$. The color value of the color component is specifically set to $-2^n$ plus the value of the n uninterpreted bits.

In one embodiment, where a program or process has not been designed to interpret the value of the uninterpreted bits based on the value of the interpretation bit, then the color value of the color component may be set as zero any time the interpretation bit has the second value. Where the second value is one, the interpretation bit can be used in such an embodiment as an underflow bit of the color component, where the device on which the color value of the color component is to be output is an n bit-depth device. Any value less than zero, such that the underflow bit of the color component, which is the interpretation bit, has a value of one, results in a color value of zero actually being output on the n bit-depth device. The lowest value of the color component is thus capped at zero.

Figure 4C:
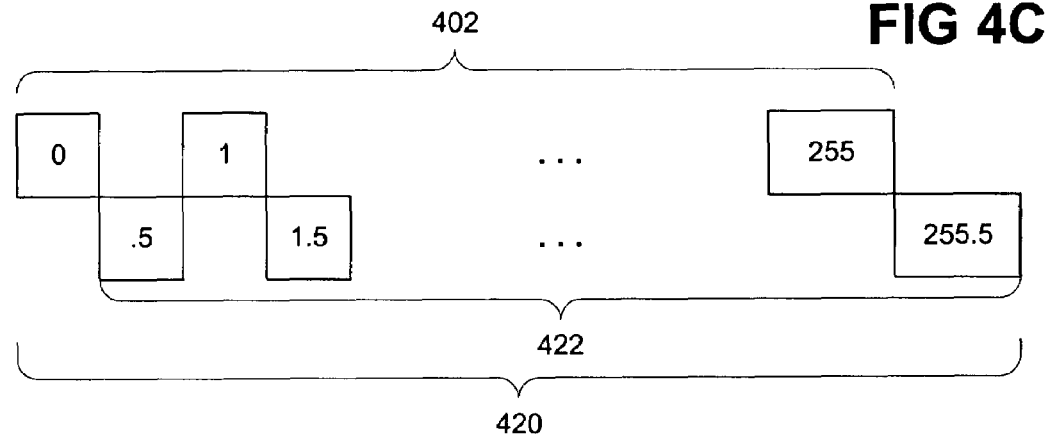

In FIG. 4C, the range of color values 420 is divided into two ranges, the range 402 and the range 422. The range 402 is used where the interpretation bit has a first value, such as zero, and the range 422 is used where the interpretation bit has a second value, such as one. The color value for the color component is equal to the value of the n=8 uninterpreted bits, and thus within the range 402, where the interpretation bit has the first value. The lowest value is 0, highest value is $2^{n=8}-1=255$, and the range 402 includes all integers between 0 and 255. The color value for the color component is equal to 0.5 plus the value of the n=8 uninterpreted bits, and thus within the range 422, where the interpretation bit has the second value. The lowest value is 0.5, and the highest value is $2^{n=8}-0.5=255.5$, in increments of 1.0, such as including 1.5, 2.5, 3.5, and so on through 255.5. The entire range 420 is therefore between 0 and 255.5, in increments of 0.5, such as including 0.5, 1.0, 1.5, and so on, through 255.5.

For example, the value of the eight uninterpreted bits may be 211. If the interpretation bit is equal to the first value, such as zero, then the color value of the color component is set as 211. If the interpretation bit is equal to the second value, such as one, then the color value of the color component is set as $0.5+211=211.5$.

More generally, the range 420 allows for color values of the color component between 0 and $2^n-0.5$, in increments of 0.5. The range 402 is used where the interpretation bit has a first value, and allows for integer color values of the color component between 0 and $2^n-1$. The color value of the color component is specifically set to the value of the n uninterpreted bits. The range 422 is used where the interpretation bit has a second value, and allows for color values of the color component between 0.5 and $2^n-0.5$, in increments of 1.0. The color value of the color component is specifically set to the value of the n uninterpreted bits plus 0.5.

The ability to use both the range 402 and the range 422 as the range 420 provides for increased accuracy as compared to just using the range 402. However, unlike the other embodiments of the invention described in conjunction with FIGS. 4A, 4B, and 4D, color component values 420 of the embodiment of FIG. 4C are able to represent half steps between integers. In one embodiment, to obtain the value that is to be represented by the uninterpreted bits, the floating-point representation of a color component value is first rounded to either an integer, or an integer plus 0.5, whichever is closer. For instance, the floating-point representation of 3.1 is rounded to integer 3, thus the interpreted bit is set to the first value. As another example, the floating-point representation of 3.7 is rounded to integer 3 plus 0.5, thus the interpreted bit is set to the second value.

In one embodiment, where a program or process has not been designed to interpret the value of the uninterpreted bits based on the value of the interpretation bit, then the color value of the color component may be set as the n uninterpreted bits regardless of the value of the interpretation bit. Ignoring the interpretation bit reduces the number of possible color values for the color component, by rounding down the color value to the nearest integer between 0 and $2^n-1$. For example, where the n=8 uninterrupted bits have a value of 211, and the interpretation bit has the second value, the color value of the color component should be 211.5. However, ignoring the interpretation bit results in the color value of the color component being 211 instead.

Figure 4D:
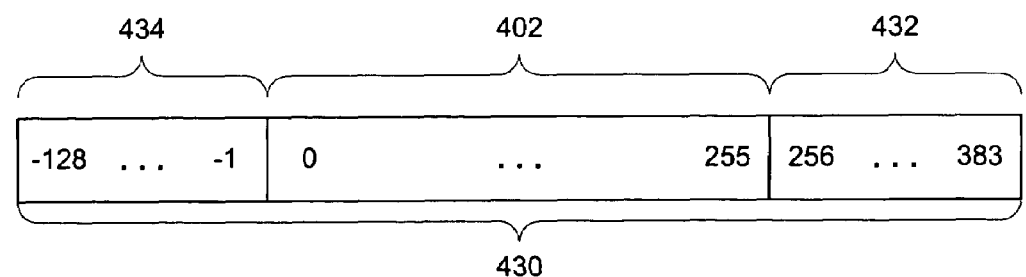

In FIG. 4D, the range of color values 430 is divided into three ranges, the range 402, the range 432, and the range 434. The range 402 is used where the interpretation bit has a first value, such as zero. The range 432 is used where the interpretation bit has a second value, such as one, and where the most significant bit of the n=8 uninterpreted bits, which is the n=8$^{th}$ uninterpreted bit, has a first value, such as zero. The range 434 is used where the interpretation bit has the second value, and where the most significant bit of the n=8 uninterpreted bits has a second value, such as one.

The color value for the color component is equal to the value of the n=8 uninterpreted bits, and thus within the range 402, where the interpretation bit has the first value. The lowest value is zero, the highest value is $2^{n=8}-1=255$, and the range 402 includes all integers between 0 and 255. The color value for the color component is equal to $2^{n=8}=256$ plus the value of the least significant n−1 bits of the n=8 uninterpreted bits, which are the first n−1=7 bits of the n=8 uninterpreted bits, where the interpretation bit has the second value, and the most significant uninterpreted bit has the first value. The lowest value is $2^n=256$, the highest value is $2^n+2^{n-1=7}-=383$, and the range 432 includes all integers between 256 and 383. The color value for the color component is equal to $-2^{n-1=7}=-128$ plus the value of the least significant n−1 bits of the n=8 uninterpreted bits, where the interpretation bit has the second value, and the most significant uninterpreted bit has the second value. The lowest value is $-2^{n-1=7}=-128$, the highest value is −1, and the range 434 includes all integers between −128 and −1. The entire range 430 is therefore between −128 and 383, including all integers between −128 and 383. The offsets that are applied to a base range, such as an offset of −128 or 128 to the base range of 0 to 255, as detailed in this and other embodiments of the invention, are not specifically applicable to all embodiments of the invention.

For example, the value of the eight uninterpreted bits may be 129, or binary 0x10000001, where the least significant seven uninterpreted bits represent the value 1. If the interpretation bit is equal to the first value, such as zero, then the color value of the color component is set as 129. If the interpretation bit is equal to the second value, such as one, then, because the most significant uninterpreted bit is set to the second value, such as one, the color value of the color component is −128+1=−127.

As another example, the value of the eight uninterpreted bits may be 3, or binary 0x00000011, where the least significant seven uninterpreted bits represent the value 3. If the interpretation bit is equal to the first value, then the color value of the color component is set as 3. If the interpretation bit is equal to the second value, then, because the most significant uninterpreted bit is equal to the first value, the color value of the color component is 256+3=259.

More generally, the range 430 allows for integer color values of the color component between $-2^{n-1}$ and $2^n+2^{n-1}-1$. The range 402 is used where the interpretation bit has a first value, and allows for integer color values of the color component between 0 and 2−1. The color value of the color component is specifically set to the value of the n uninterpreted bits. The range 432 is used where the interpretation bit has a second value and where the most significant uninterpreted bit has a first value, and allows for integer color values of the color component between $2^n$ and $2^n+2^{n-1}-1$. The color value is specifically set to $2^n$ plus the least significant n−1 uninterpreted bits. The range 434 is used where the interpretation bit has the second value and where the most significant uninterpreted bit has the second value, and allows for integer color values of the color component between $-2^{n-1}$ and −1. The color value is specifically set to $-2^{n-1}$ plus the least significant n−1 uninterpreted bits.

In one embodiment, where a program or process has not been designed to interpret the value of the uninterpreted bits based on the value of the interpretation bit, then the color value of the color component may be set as zero when the interpretation bit has the second value and the most significant uninterpreted bit has a second value, and as $2^n-1$ when the interpretation bit has the second value and the most significant uninterpreted bit has a first value. Any color value less than zero is actually capped at zero. Any color value greater than $2^n-1$ is actually capped at $2^n-1$.

FIG. 5 shows a method 500 for displaying the color value of a color component of a pixel, according to an embodiment of the invention, where the pixel has for the color component n uninterpreted bits and one interpretation bit. The method 500 may be employed to display image data that has a number of pixels, where each pixel has n uninterpreted bits and an interpretation bit for each color component of a color space. For example, where the color space is the red-green-blue (RGB) color space, each pixel has n uninterpreted bits and an interpretation bit for each of the red, green, and blue color components of the RGB color space. More generally, the method 500 is for outputting the color value of a color component of a pixel, where such outputting may be displaying, printing, and so on.

If the interpretation bit of the pixel for the color component has a first value, such as zero (502), then the color value for the color component of the pixel is displayed as the value of the n uninterpreted bits of the pixel for the color component (504). For example, if the n=8 uninterpreted bits represent a value of 9, then the color component value is equal to and displayed as 9 as well. However, if the interpretation bit does not have the first value (502), then it has a second value, such as one (506), since the interpretation bit can only have either the first value or the second value. In this case, either 508, 510, 512, or 514 is performed, depending on the embodiment of the invention. 508 corresponds to the scenario described in conjunction with FIG. 4A. 510 corresponds to the scenario described in conjunction with FIG. 4B. 512 corresponds to the scenario described in conjunction with FIG. 4C. 514 corresponds to the scenario described in conjunction with FIG. 4D.

In 508, the color value for the color component of the pixel is displayed as $2^n$ plus the value of the n uninterpreted bits. For example, if the n=8 uninterpreted bits represent a value of 9, then the color component value is equal to and displayed as $2^8=256+9=265$. In 510, the color value for the color component of the pixel is displayed as $-2^n$ plus the value of the n uninterpreted bits. For example, if the n=8 uninterpreted bits represent a value of 9, then the color component value is equal to and displayed as $-2^8+9=-256+9=-247$. In 512, the color value for the color component of the pixel is displayed as 0.5 plus the value of the n uninterpreted bits. For example, if the n=8 uninterpreted bits represent a value of 9, then the color component value is equal to and displayed as 0.5+9=9.5.

In 514, the color value for the color component of the pixel is displayed as the least significant n−1 uninterpreted bits, plus either $2^n$ or $-2^{n-1}$, depending on the value of the most significant interpreted bit. For instance, where the most significant nth interpreted bit is equal to a first value, such as zero, then the color component value is displayed as the least significant n−1 uninterpreted bits plus $2^n$, and where the most significant nth interpreted bit is equal to a second value, such as one, then the color component value is displayed as the least significant n−1 uninterpreted bits plus −$2^{n-1}$. For example, if the n=8 uninterpreted bits represent a value of 9, which is binary 0x00001001, then the most significant eighth bit is zero, and the color component value is equal to and displayed as $2^8+9=256+9=265$. As another example, if the n=8 bits represent a value of 137, which is binary 0x10001001, then the most significant eighth bit is one, and the color component value is equal to and displayed as $-2^{8-1}+(137-2^{8-1})=-128+(137-128)=-119$, or $-2^8+137=-119$.

FIG. 6 shows a method 600 for encoding the color value of a color component of a pixel into n uninterpreted bits and one interpretation bit, according to an embodiment of the invention. That is, the method 600 is for efficiently encoding a color component value into n uninterpreted bits and one interpretation bit. The color value of the color component of the pixel that is being encoded may be referred to as the original color component value. The n uninterpreted bits may be referred to as the new color component value. The method 600 may be employed to encode image data that has a number of pixels, where each pixel has a color value for each color component of a color space. For example, where the color space is the RGB color space, each pixel has a color value for each of the red, green, and blue color components of the RGB color space.

If the color component value is between 0 and $2^n-1$ and is an integer (602), then the n uninterpreted bits are set equal to the color component value (604), and the interpretation bit is set to a first value, such as zero (606). For example, if n=8 and the color component value is 9, then the n uninterpreted bits are set equal to 9 and the interpretation bit is set to the first value. However, if the color component value is not between 0 and $2^n-1$ or is not an integer, then either 608, 610, and 612; 614, 616, and 618; 620, 622, and 624; or, 626, 628, 630, and 632, are performed, depending on the embodiment of the invention. 608, 610, and 612 correspond to the scenario described in conjunction with FIG. 4A. 614, 616, and 618 correspond to the scenario described in conjunction with FIG. 4B. 620, 622, and 624 correspond to the scenario described in conjunction with FIG. 4C. 626, 628, 630, and 632 correspond to the scenario described in conjunction with FIG. 4D.

In 608, the color value for the color component of the pixel is between $2^n$ and $2^{n+1}-1$. Therefore, the n uninterpreted bits are set equal to the color component value minus $2^n$ (610). For example, if n=8 and the color component value is 265, then the n uninterpreted bits are set equal to $265-2^8=265-256=9$. The interpretation bit is also set to a second value, such as one (612).

In 614, the color value for the color component of the pixel is between $-2^n$ and −1. Therefore, the n uninterpreted bits are set equal to the color component value plus $2^n$ (616). For example, if n=8 and the color component value is −247, then the n uninterpreted bits are set equal to $-247+2^8=-247+256=9$. The interpretation bit is also set to a second value, such as one (618).

In 620, the color value for the color component of the pixel is between 0.5 and $2^n-0.5$, but is a non-integer. Therefore, the n uninterpreted bits are set equal to the color component value minus 0.5 (622). For example, if n=8 and the color component value is 9.5, then the n uninterpreted bits are set equal to 9.5−0.5=9. The interpretation bit is also set to a second value, such as one (624).

In 626, the color value for the color component of the pixel is either between $-2^{n-1}$ and −1, or between $2^n$ and $2^n+2^{n+1}-1$. Therefore, the least significant n−1 uninterpreted bits are set equal to the color component value plus $2^{n-1}$, where the color component value is negative, or equal to the color component value minus $2^n$, where the color component value is positive (628). The most significant nth uninterpreted bit is set equal to a first value, such as zero, if the color component value is positive, and to a second value, such as one, if the color component value is negative (630).

For example, if n=8 and the color component value is 265, then the least significant n−1 uninterpreted bits are set equal to the value $265-2^8=265-256=9$, and the most significant nth uninterpreted bit is set to the first value. As another example, if n=8 and the color component value is −119, then the least significant n−1 uninterpreted bits are set equal to the value $-119+2^{8-1}=-119+128=9$, and the most significant nth uninterpreted bit is set to the second value. Finally, the interpretation bit is again set to a second value (632).

Representing Extended Color Gamut Information with Two Interpretation Bits

Figure 7A:
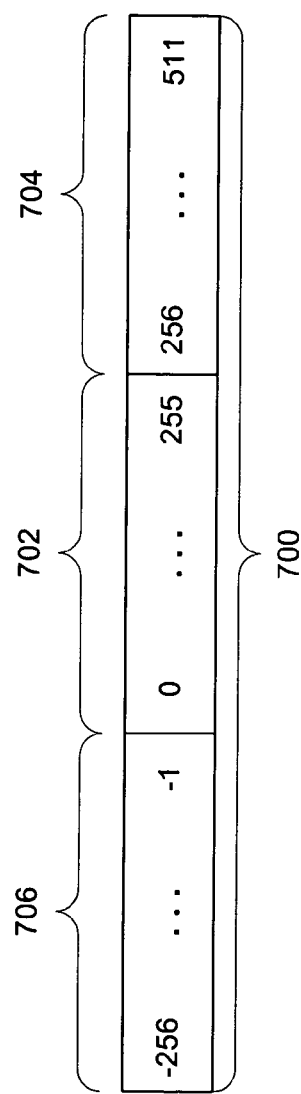
FIGS. 7A and 7B are diagrams depicting the extended color gamut ranges for a color component of a pixel that has an uninterpreted value and two interpretation bits, according to varying embodiments of the invention.
Figure 7B:
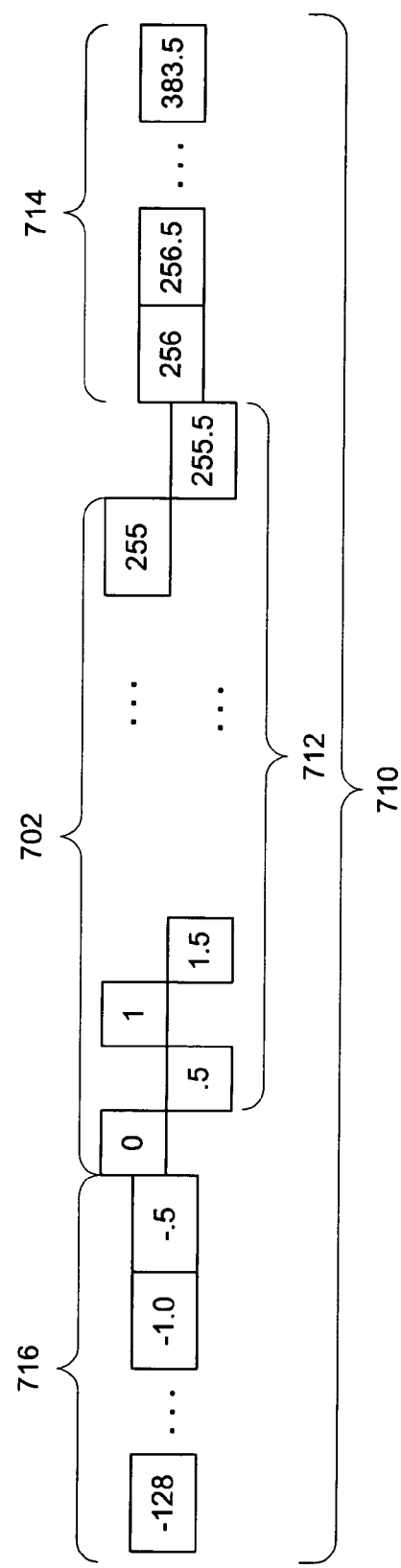

FIGS. 7A and 7B illustratively show the color gamut range for a color component, or channel, of a pixel, in which there are eight uninterpreted bits and two interpretation bits, according to varying embodiments of the invention. More generally, there can be n uninterpreted bits, such that FIGS. 7A and 7B specifically show the case where n=8. The range of color values depicted in FIGS. 7A and 7B may be for the color component 300 of FIG. 3 of the pixel 200 of FIG. 2.

In FIG. 7A, the range of color values 700 is divided into three ranges, the range 702, the range 704, and the range 706. The range 702 is used where the interpretation bits represent a first value, such as binary 0x00, or zero. The range 704 is used where the interpretation bits represent a second value, such as binary 0x01, or one. The range 706 is used where the interpretation bits represent a third value, such as binary 0x10, or two.

The color value for the color component is equal to the value of the n=8 uninterpreted bits, and thus within the range 702, when the interpretation bits have the first value. The lowest value is 0, the highest value is $2^{n=8}-1=255$, and the range 702 includes all integers between 0 and 255. The color value for the color component is equal to $2^n=256$ plus the value of the n=8 uninterpreted bits, and thus within the range 704, when the interpretation bits have the second value. The lowest value is $2^n=256$, the highest value is $2\times2^{n=8}-1=511$, and the range 704 includes all integers between 256 and 511. The color value of the color component is equal to $-2^n$ plus the value of the n=8 uninterpreted bits, and thus within the range 706, when the interpretation bits have the third value. The lowest value is $-2^n=-256$, the highest value is −1, and the range 706 includes all integers between −256 and −1. The entire range 700 is therefore between −256 and 511, including all integers between −256 and 511.

For example, the value of the eight uninterpreted bits may be 211. If the interpretation bits are equal to the first value, then the color value of the color component is set as 211. If the interpretation bits are equal to the second value, then the color value of the color component is set as 256+211=457. If the interpretation bits are equal to the third value, such as one, then the color value of the color component is set as −256 plus 211=−45.

More generally, the range 700 allows for integer color values of the color component between $-2^n$ and $(2\times2^n)-1$. The range 702 is used where the interpretation bits have a first value, and allows for integer color values of the color component between 0 and $2^n-1$. The color value of the color component is specifically set to the value of the n uninterpreted bits. The range 704 is used where the interpretation bits have a second value, and allows for integer color values of the color component between $2^n$ and $(2 \times 2^n)-1$. The color value of the color component is specifically set to $2^n$ plus the value of the n uninterpreted bits. The range 706 is used where the interpretation bits have a third value, and allows for integer color values of the color component between $-2^n$ and $-1$. The color value of the color component is specifically set to $-2^n$ plus the value of the n uninterpreted bits.

In FIG. 7B, the range of the color values 710 is divided into four ranges, the range 702, the range 712, the range 714, and the range 716. The range 702 is used where the interpretation bits represent a first value, such as binary 0x00, or zero. The range 712 is used where the interpretation bits represent a second value, such as binary 0x01, or one. The range 714 is used where the interpretation bits represent a third value, such as binary 0x10, or two. The range 716 is used where the interpretation bits represent a fourth value, such as binary 0x11, or three.

The color value for the color component is equal to the value of the n=8 uninterpreted bits, and thus within the range 702, when the interpretation bits have the first value. The lowest value is 0, the highest value is $2^{n=8}-1=255$, and the range 702 includes all integers between 0 and 255. The color value for the color component is equal to 0.5 plus the value of the n=8 uninterpreted bits, and thus within the range 712, where the interpretation bits have the second value. The lowest value is 0.5, and the highest value is $2^{n=8}-0.5=255.5$, in increments of 1.0, such as including 1.5, 2.5, 3.5, and so on through 255.5.

The color value for the color component is equal to $2^{n=8}=256$, plus the value of the n=8 uninterpreted bits divided by 2, and thus within the range 714, when the interpretation bits have the third value. The lowest value is 256, and the highest value is $2^{n=8}+2^{(n=8)-1}-0.5=383.5$, in increments of 0.5, such as including 256, 256.5, 257, and so on through 383.5. The color value for the color component is equal to $-2^{(n=8)-1}$, plus the value of the n=8 uninterpreted bits divided by 2, and thus within the range 716, when the interpretation bits have the fourth value. The lowest value is $-128$, and the highest value is $-0.5$, in increments of 0.5, such as including $-128$, $-127.5$, $-127$, and so on through $-0.5$. The entire range 710 is thus between $-128$ and 383.5, in 0.5 increments.

For example, the value of the eight uninterpreted bits may be 211. If the interpretation bits are equal to the first value, then the color value of the color component is also 211. If the interpretation bits are equal to the second value, then the color value of the color component is $211+0.5=211.5$. If the interpretation bits are equal to the third value, then the color value of the color component is $256+(211/2)=361.5$. If the interpretation bits are equal to the fourth value, then the color value of the color component is $-128+(211/2)=-22.5$.

More generally, the range 710 allows for color values of the color component between $-2^{n-1}$ and $2^n+2^{n-1}-0.5$, in increments of 0.5. The range 702 is used where the interpretation bits have a first value, and allows for integer color values of the color component between 0 and $2^n-1$. The color value of the color component is specifically set to the value of the n uninterpreted bits. The range 712 is used where the interpretation bits have a second value, and allows for color values of the color component between 0.5 and $2^n-0.5$, in increments of 1.0. The color value of the color component is specifically set to the value of the n uninterpreted bits plus 0.5.

The range 714 is used where the interpretation bits have a third value, and allows for color values of the color component between $2^n$ and $2^n+2^{n-1}-0.5$, in increments of 0.5. The color value of the color component is specifically set to $2^n$, plus the value of the n uninterpreted bits divided by 2. The range 716 is used where the interpretation bits have a fourth value, and allows for color values of the color component between $-2^{n-1}$ and $-0.5$, in increments of 0.5. The color value of the color component is specifically set to $-2^{n-1}$, plus the value of the n uninterpreted bits divided by 2.

The range 710 thus provides for increased accuracy, by allowing for color values between successive integer color values, and extended range beyond the normal range of 0 and 255 for gamut extension. However, unlike the other embodiments of the invention described in conjunction with FIG. 7A, color component values within the range 710 of the embodiment of FIG. 7B are able to represent half steps between integers In one embodiment, to obtain the value that is to be represented by the uninterpreted bits, the floating-point representation of a color component value is first rounded to either an integer, or an integer plus 0.5, whichever is closer. For instance, the floating-point representation of 3.1 is rounded to the integer 3, and 3.4 may be rounded to 3.5.

Figure 8A:
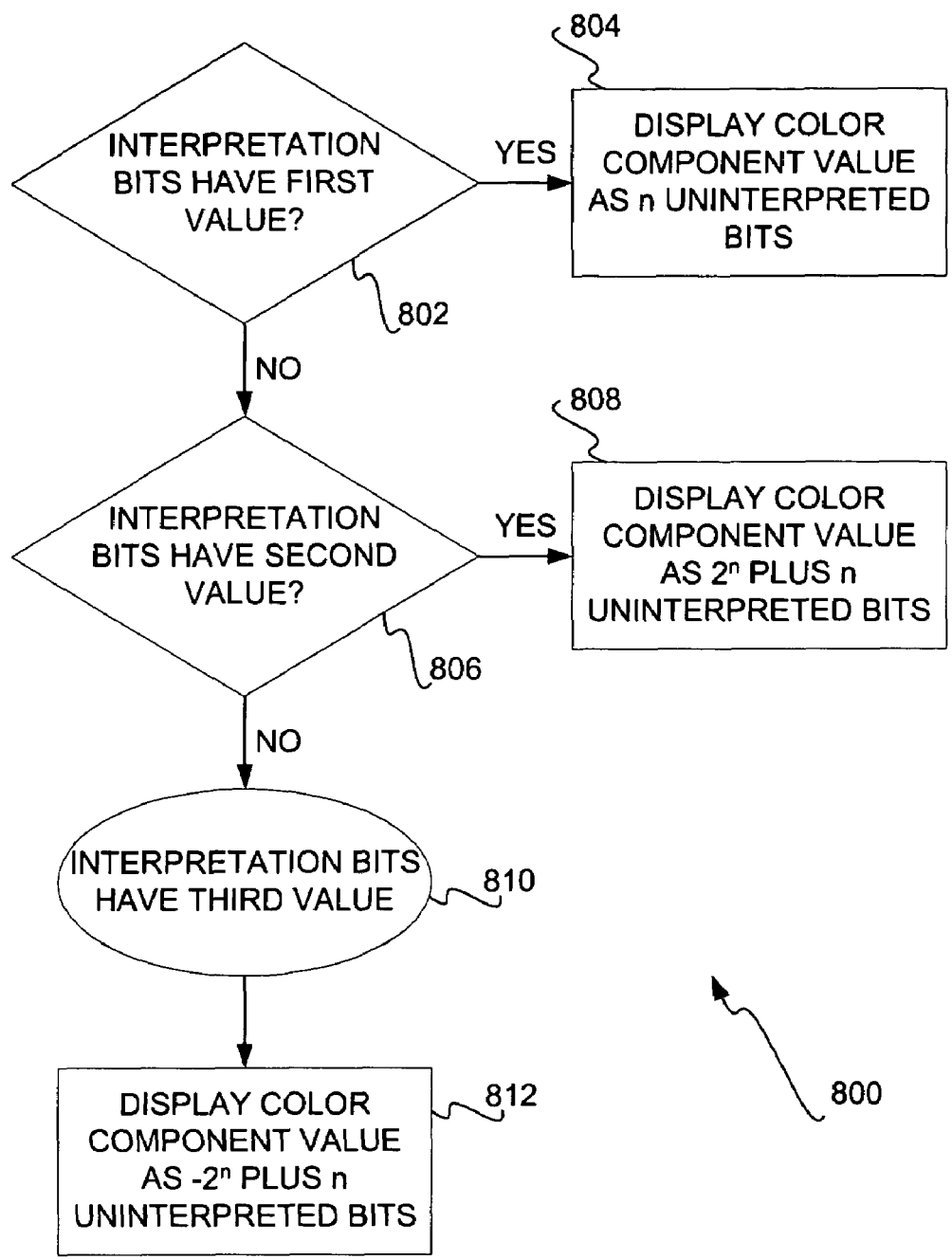
FIGS. 8A and 8B are flowcharts of methods for displaying a color component value of a pixel that has an uninterpreted value and two interpretation bits for the color component, according to varying embodiments of the invention.
Figure 8B:
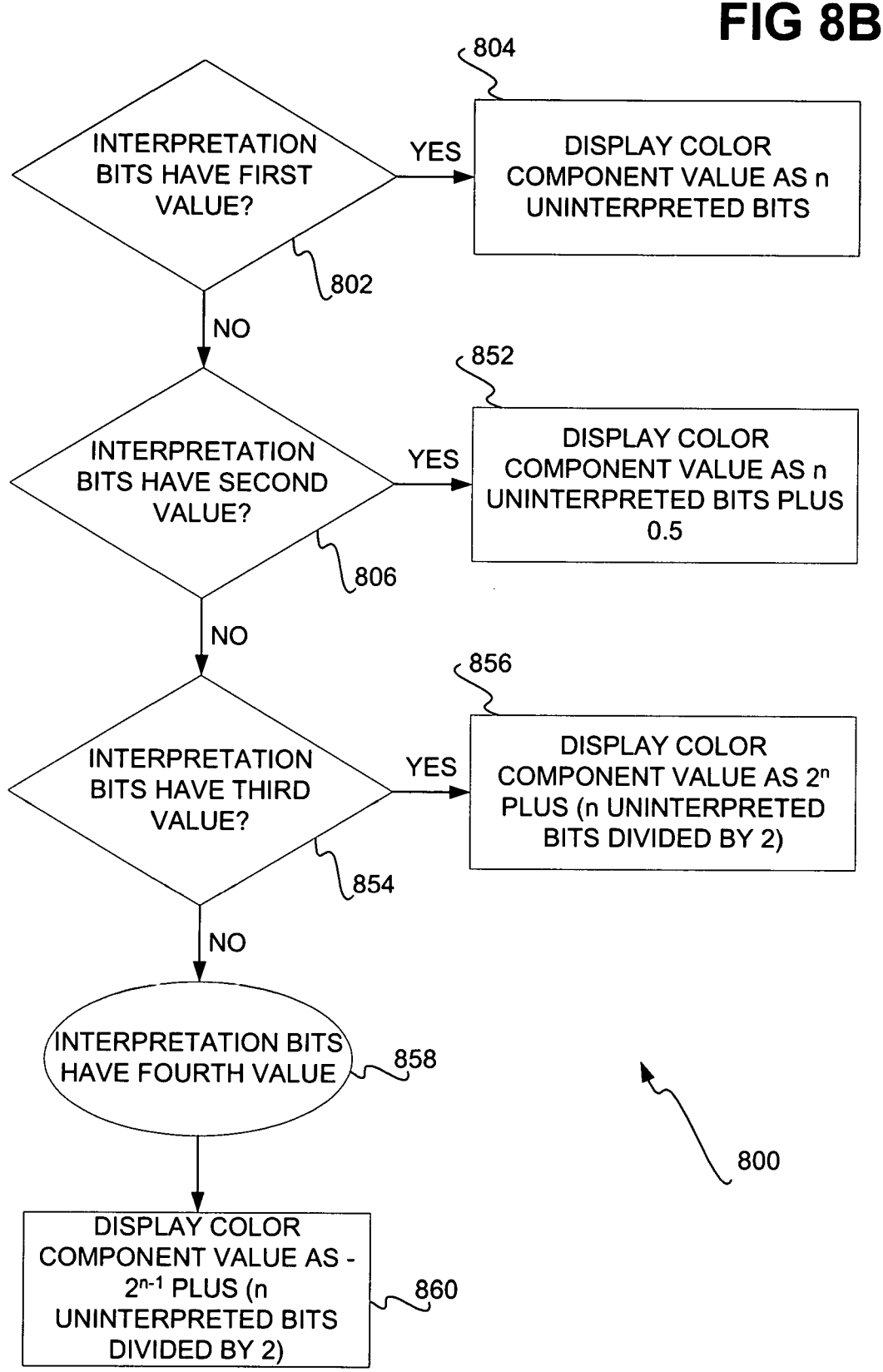

FIGS. 8A and 8B show a method 800 for displaying the color value of a color component of a pixel, according to varying embodiments of the invention, where the pixel has for the color component n uninterpreted bits and two interpretation bits. The method 800 may be employed to display image data that has a number of pixels, where each pixel has n uninterpreted bits and two interpretation bits for each color component of a color space. For example, where the color space is the red-green-blue (RGB) color space, each pixel has n uninterpreted bits and two interpretation bits for each of the red, green, and blue color components of the RGB color space. More generally, the method 800 is for outputting the color value of a color component of a pixel, where such outputting may be displaying, printing, and so on. Displaying a pixel is also inclusive of forming a pixel on media, such as by using an inkjet-printing device, for instance.

In the embodiment of FIG. 8A, the method 800 corresponds to the scenario described in conjunction with FIG. 7A. If the interpretation bits of the pixel for the color component have a first value (802), then the color value for the color component of the pixel is displayed as the value of the n uninterpreted bits of the pixel for the color component (804). For example, if the n=8 uninterpreted bits represent a value of 9, then the color component value is equal to and displayed as 9 as well.

However, if the interpretation bits do not have the first value (802), but if they have the second value (806), then the color value for the color component of the pixel is displayed as $2^n$ plus the value of the n uninterpreted bits of the pixel for the color component (808). For example, if the n=8 uninterpreted bits represent a value of 9, then the color component value is equal to and displayed as $2^8+9=265$. However, if the interpretation bits do not have the second value (806), then they have the third value (810). The color value for the color component of the pixel is therefore displayed as $-2^n$ plus the value of the n uninterpreted bits (812). For example, if the n=8 uninterpreted bits represent a value of 9, then the color component value is equal to and display as $-2^8+9=-247$.

In the embodiment of FIG. 8B, the method 800 corresponds to the scenario described in conjunction with FIG. 7B. Like-numbered parts of the method 800 in FIGS. 8A and 8B are performed identically. Thus, if the interpretation bits of the pixel for the color component have a first value (802), then the color value for the color component of the pixel is displayed as the value of the n uninterpreted bits of the pixel for the color component (804). For example, if the n=8 uninterpreted bits represent a value of 9, then the color component value is equal to and displayed as 9 as well.

However, if the interpretation bits do not have the first value (802), but if they have the second value (806), then the color value for the color component of the pixel is displayed as 0.5 plus the n uninterpreted bits (852). For example, if the n=8 uninterpreted bits represent a value of 9, then the color component value is equal to and displayed as 0.5+9=9.5. However, if the interpretation bits do not have the second value (806), but they do have the third value (854), then the color component value is displayed as $2^n$ plus the n uninterpreted bits divided by 2 (856). For example, if the n=8 uninterpreted bits represent a value of 9, then the color component value is equal to and displayed as 256+(9/2) =260.5. However, if the interpretation bits do not have the third value (854), then they have the fourth value (858). The color component value is displayed as $-2^{n-1}$ plus the n uninterpreted bits divided by 2 (860). For example, if the n=8 uninterpreted bits represent a value of 9, then the color component value is equal to and displayed as −128+(9/2) =−123.5.

Figure 9A:
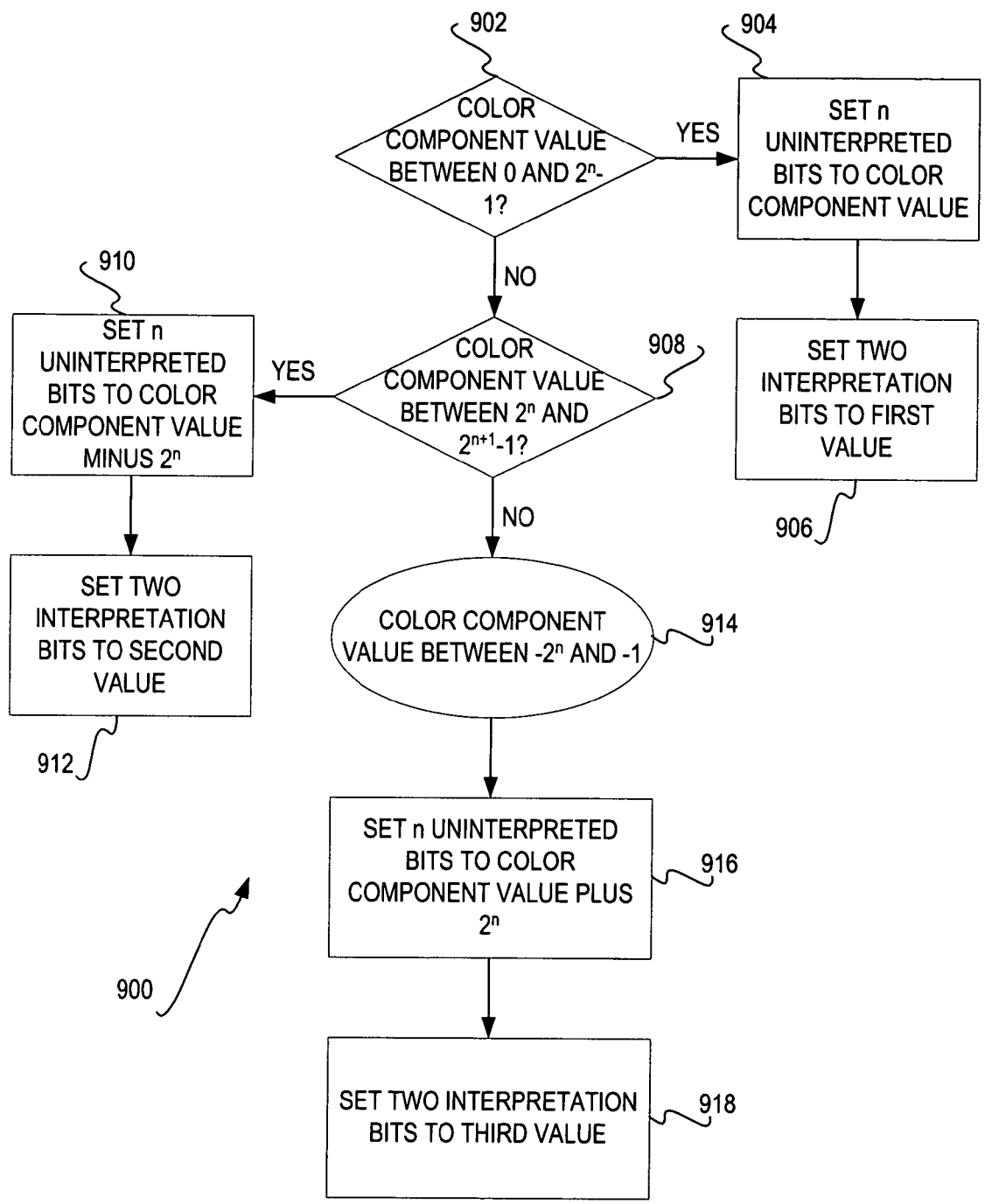

FIGS. 9A and 9B show a method 900 for encoding the color value of a color component of a pixel into n uninterpreted bits and two interpretation bits, according to varying embodiments of the invention. That is, the method 900 is for efficiently encoding a color component value into n uninterpreted bits and two interpretation bits. The color value of the color component of the pixel that is being encoded may be referred to as the original color component value. The n uninterpreted bits may be referred to as the new color component value. The method 900 may be employed to encode image data that has a number of pixels, where each pixel has a color value for each color component of a color space. For example, where the color space is the RGB color space, each pixel has a color value for each of the red, green, and blue color components of the RGB color space.

In the method of FIG. 9A, the method 900 corresponds to the scenario described in conjunction with FIG. 7A. If the color component value is between 0 and $2^n-1$ (902), then the n uninterpreted bits are set to the color component value (904), and the two interpretation bits are set to a first value (906). For example, if n=8 and the color component value is 9, then the n uninterpreted bits are set to 9 and the interpretation bits are set to the first value. However, if the color component value is not between 0 and $2^n-1$ (902), but is between $2^n$ and $2^{n+1}-1$ (908), then the n uninterpreted bits are set to the color component value minus $2^n$ (910), and the interpretation bits are set to the second value (912). For example, if n=8 and the color component value is 265, then the n uninterpreted bits are set to 265−256=9 and the interpretation bits are set to the second value.

However, if the color component value is not between $2^n$ and $2^{n+1}-1$ (908), then it is between $-2^n$ and −1 (914). The n uninterpreted bits are set to the color component value plus $2^n$ (916), and the two interpretation bits are set to the third value (918). For example, if n=8 and the color component value is −119, then the n uninterpreted bits are set to −119+128=−9 and the interpretation bits are set to the third value.

In the method of FIG. 9B, the method 900 corresponds to the scenario described in conjunction with FIG. 7B. Like-numbered parts of the method 900 in FIGS. 9A and 9B are performed at least substantially identically. If the color component value is between 0 and $2^n-1$ and is an integer (902), then the n uninterpreted bits are set to the color component value (904), and the two interpretation bits are set to a first value (906). For example, if n=8 and the color component value is 9, then the n uninterpreted bits are set to 9 and the interpretation bits are set to the first value.

However, if the color component value is not between 0 and $2^n-1$ or is not an integer (902), but is between 0.5 and $2^n-0.5$ and is a non-integer—that is, the color component value is an integer plus 0.5 (908), then the n uninterpreted bits are set to the color component value minus 0.5 (952), and the two interpretation bits are set to the second value (912). For example, if n=8 and the color component value is 9.5, then the n uninterpreted bits are set to 9.5−0.5 =9 and the interpretation bits are set to the second value. However, if the color component value is not between 0.5 and $2^n-0.5$ or is an integer (908), but is between $2^n$ and $2^n+2^{n-1}-0.5$ (954), then the n uninterpreted bits are set to the color component value minus $2^n$, and the resulting amount is multiplied by 2 (956). The two interpretation bits are set to the third value (918). For example, if n=8 and the color component value is 260.5, then the n uninterpreted bits are set to (260.5−256)×2=9 and the interpretation bits are set to the third value.

However, if the color component value is not between $2^n$ and $2^n+2^{n-1}-0.5$ (954), then it is between $-2^{n-1}$ and −0.5 (958). The n uninterpreted bits are set to the color component value plus $2^{n-1}$, and the resulting amount is multiplied by 2 (960). The two interpretation bits are set to the fourth value (962). For example, if n=8 and the color component value is −123.5, then the n uninterpreted bits are set to (−123.5+128)×2=9, and the interpretation bits are set to the fourth value.

SYSTEM AND CONCLUSION

Figure 10:
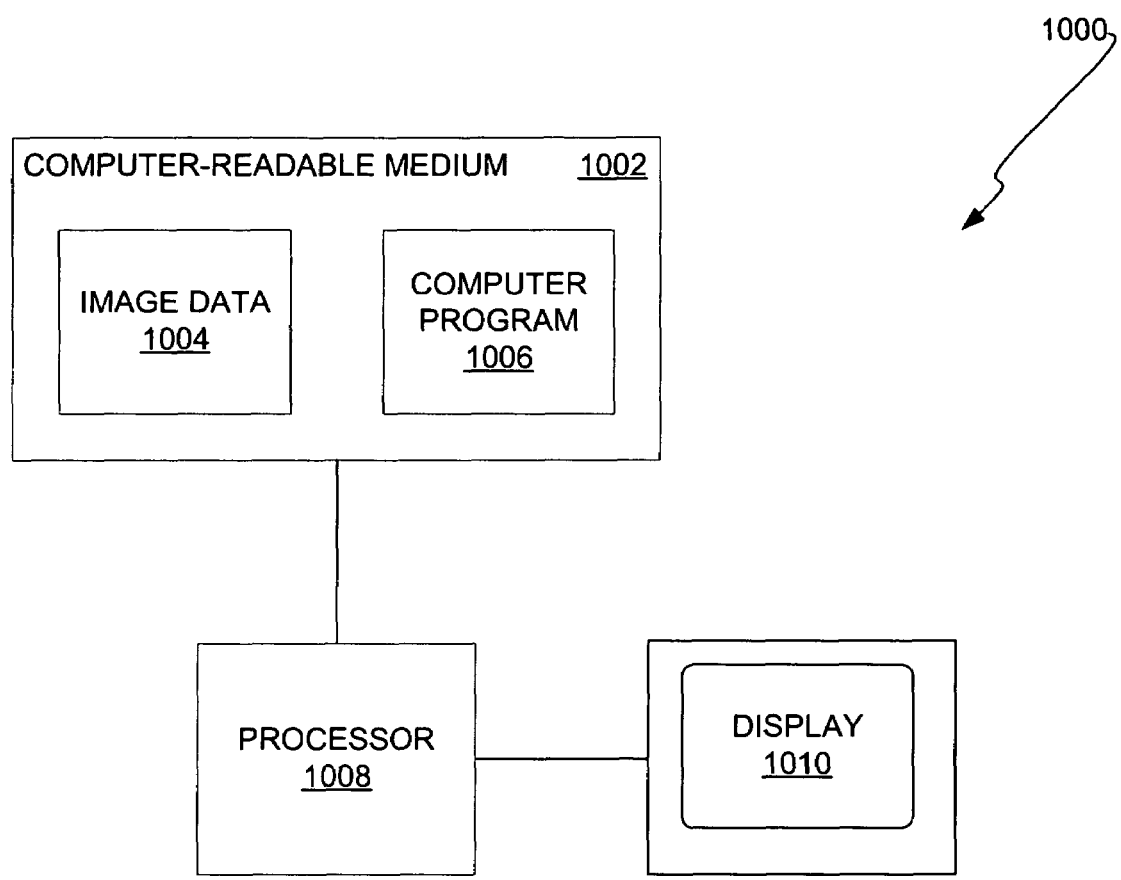
FIG. 10 is a block diagram of a representative system, according to an embodiment of the invention.

FIG. 10 shows a system 1000, according to an embodiment of the invention. The system 1000 includes a computer-readable medium 1002 on which image data 1004 and a computer program 1006 is stored, a processor 1008, and optionally a display 1010. The system 1000 may include other components in addition to and/or in lieu of those depicted in FIG. 10, such as other output devices like inkjet or laser printers, additional computer-readable media, and so on.

The image data 1004 is formatted in accordance with one or more of the data structures that have been described in previous sections of the detailed description. For instance, the image data 1004 may have a number of pixels that have values for color components of a color space, where the values are to be converted to uninterpreted bits and one or more interpretation bits. As another example, the image data 1004 may have a number of pixels that have values for color components of a color space, where the values are the uninterpreted bits, and the image data also includes one or more interpretation bits for each of the values. In one particular embodiment, where the uninterpreted bits for each color component number n and the one or more interpretation bits for the uninterpreted bits number k, there are $2^{n+k}$ possible color values for the color component. The uninterpreted bits of all components can be packed to a byte (or bytes) and encoded by an extra channel (or component). Thus, n+k bits are employed to efficiently represent the extended color gamut of the $2^{n+k}$ possible color component values for each channel.

The image data 1004 may be stored as a data file of a particular format, such as a Tagged Image File Format (TIFF) data file, a Joint Photographic Experts Group (JPEG) data file, or a data file of another format type. In the case where the image data 1004 is stored as a TIFF file, the interpretation bits for all color components of each pixel may be packed to a byte (or bytes) and stored as the alpha channel data of the TIFF file. In the case where the image data 1004 is stored as a JPEG file, the interpretation bits for all color components may be stored as tag data of the JPEG file. Where the color space being used is the red-green-blue (RGB) color space, the interpretation bits for all of the red, green, and blue color components of each pixel can be stored in an extra eight-bit byte, where there are no more than eight total interpretation bits. For example, there may be three interpretation bits for each of two of the three color components, and two interpretation bits for the remaining color component.

The computer program 1006 may perform one or two of two functions. First, the computer program 1006 may convert the value of each color component for each pixel of the image data 1004 to a new value of the color component having n uninterpreted bits and at least one interpretation bit to interpret the n uninterpreted bits. In this embodiment, the program 1006 is thus able to perform the method 600 of FIG. 6 and/or the method 900 of FIGS. 9A and/or 9B.

Second, the computer program 1006 may display each color component for each pixel of the image data 1004 based on a value of the at least one interpretation bit, as the color value of the pixel for the color component. In this embodiment, the computer program 1006 is thus able to perform the method 500 of FIG. 5 and/or the method 800 of FIGS. 8A and/or 8B. It is noted that whereas the computer program 1006 is depicted in FIG. 10 as being on the same computer-readable medium 1002 as the image data 1004 is, in another embodiment the program 1006 may be on a different computer-readable medium as compared to that on which the image data 1004 resides.

The processor 1008 may include one or more processors, and executes the computer program 1006 by accessing the computer-readable medium 1002. The processor 1008 executes the computer program 1006 with respect to the image data 1004 by also accessing the computer-readable medium 1002. While the computer program 1006 is to display the pixels of the image data 1004, the processor 1008 displays the pixels on the display 1010.

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. For instance, whereas some embodiments of the invention have been depicted and described as having one interpretation bits, and other embodiments have been depicted and described as having two interpretation bits, still other embodiments may have more than two interpretation bits.

As another example, color gamut or color precision may be extended or increased. At least some embodiments of the invention are applicable to existing file formats, and provide for backward and forward compatibility. For instance, as has been noted, even if a particular program or process is not able to interpret the n uninterpreted bits using the n interpretation bits, the n uninterpreted bits can in some embodiments nevertheless be utilized as pertaining to the non-extended color gamut. This application is intended to cover any adaptations or variations of the present invention. Therefore, it is manifestly intended that this invention be limited only by the claims and equivalents thereof.

We claim:

1. A method for displaying image data having a plurality of pixels, each pixel having a plurality of values corresponding to a plurality of color components of a color space, each value having a plurality of bits numbering n, the method comprising for each color component and for each pixel:
    where an interpretation bit for the value of the pixel for the color component is a first value, displaying the color component for the pixel as the value of the pixel for the color component; and,
    where the interpretation bit for the value of the pixel for the color component is a second value, displaying the color component for the pixel as one of:
        $2^n$ plus the value of the pixel for the color component;
        $-2^n$ plus the value of the pixel for the color component;
        0.5 plus the value of the pixel for the color component;
        where the most significant bit of the plurality of bits of the value of the pixel for the color component is a first value, $-2^n-1$ plus a value equal to the least significant (n−1) bits of the plurality of bits of the value of the pixel for the color component; and,
        where the most significant bit of the plurality of bits of the value of the pixel for the color component is a second value, $2^n$ plus a value equal to the least significant (n−1) bits of the plurality of bits of the value of the pixel for the color component.

2. The method of claim 1, wherein the color space is a red-green-blue (RGB) color space, the plurality of color components of the color space comprising a red color component, a green color component, and a blue color component.

3. The method of claim 1, wherein n=8.

4. The method of claim 1, wherein displaying the image data comprises forming an image on media.

5. A method for displaying image data having a plurality of pixels, each pixel having a plurality of values corresponding to a plurality of color components of a color space, each value having a plurality of bits numbering n, the method comprising for each color component and for each pixel, where the value of the pixel for the color component has a pair of interpretation bits,
    where the pair of interpretation bits for the value of the pixel for the color component has a first pair of values, displaying the color component for the pixel as the value of the pixel for the color component;
    where the pair of interpretation bits for the value of the pixel for the color component has a second pair of values, displaying the color component for the pixel as $2^n$ plus the value of the pixel for the color component; and,
    where the pair of interpretation bits for the value of the pixel for the color component has a third pair of values, displaying the color component for the pixel as $-2^n$ plus the value of the pixel for the color component.

6. The method of claim 5, wherein the color space is a red-green-blue (RGB) color space, the plurality of color components of the color space comprising a red color component, a green color component, and a blue color component.

7. The method of claim 5, wherein displaying the image data comprises forming an image on media.

8. A method for displaying image data having a plurality of pixels, each pixel having a plurality of values corresponding to a plurality of color components of a color space, each value having a plurality of bits numbering n, the method comprising for each color component and for each pixel, where the value of the pixel for the color component has a pair of interpretation bits, where the pair of interpretation bits for the value of the pixel for the color component has a first pair of values, displaying the color component for the pixel as the value of the pixel for the color component;

where the pair of interpretation bits for the value of the pixel for the color component has a second pair of values, displaying the color component for the pixel as 0.5 plus the value of the pixel for the color component;

where the pair of interpretation bits for the value of the pixel for the color component has a third pair of values, displaying the color component for the pixel as $2^n$ plus (the value of the pixel for the color component divided by 2); and, where the pair of interpretation bits for the value of the pixel for the color component has a fourth pair of values, displaying the color component for the pixel as $-2^n-1$ plus (the value of the pixel for the color component divided by 2).

9. The method of claim 8, wherein the color space is a red-green-blue (RGB) color space, the plurality of color components of the color space comprising a red color component, a green color component, and a blue color component.

10. The method of claim 8, wherein displaying the image data comprises forming an image on media.

11. A system comprising:
a processor;
a computer-readable medium having image data stored thereon having a plurality of pixels, each pixel having a plurality of values corresponding to a plurality of color components of a color space, the value of the pixel for each color component having at least one interpretation bit; and,
a computer program executed by the processor to display each color component for each pixel based on a value of the at least one interpretation bit for the value of the color component for the pixel,
wherein the color space is a red-green-blue (RGB) color space, the plurality of color components of the color space comprising a red color component, a green color component, and a blue color component, and
wherein the value of each pixel for each color component comprises 8 bits, the values of the pixel for two of the red, green, and blue color components each having a pair of interpretation bits, and the value of the pixel for the other of the red, green, and blue color components having a single interpretation bit.

12. The system of claim 11, wherein the computer program is executed from the computer-readable medium on which the image data is stored.

13. The system of claim 11, wherein the computer program is executed from a different computer-readable medium than the computer-readable medium on which the image data is stored.

14. The system of claim 11, farther comprising a display on which the computer program displays each color component for each pixel.

15. A system comprising:
a computer-readable medium having image data stored thereon having a plurality of pixels, each pixel having a plurality of values corresponding to a plurality of color components of a color space, the value of the pixel for each color component having at least one interpretation bit; and,
means for displaying each color component for each pixel based on a value of the at least one interpretation bit for the value of the color component for the pixel,
wherein the color space is a red-green-blue (RGB) color space, the plurality of color components of the color space comprising a red color component, a green color component, and a blue color component, and wherein the value of each pixel for each color component comprises 8 bits, the values of the pixel for two of the red, green, and blue color components each having a pair of interpretation bits, and the value of the pixel for the other of the red, green, and blue color components having a single interpretation bit.

* * * * *

UNITED STATES PATENT AND TRADEMARK OFFICE
CERTIFICATE OF CORRECTION

PATENT NO.       : 7,352,893 B2
APPLICATION NO.  : 10/615860
DATED            : April 1, 2008
INVENTOR(S)      : Huanzhao Zeng et al.

It is certified that error appears in the above-identified patent and that said Letters Patent is hereby corrected as shown below:

In column 7, line 21, delete "$2^n+2^{n-1=7}-=383$" and insert -- $2^n+2^{n-1=7}-1=383$ --, therefor.

In column 7, line 57, delete "2-1" and insert -- $2^n-1$ --, therefor.

In column 18, line 17, in Claim 14, delete "farther" and insert -- further --, therefor.

Signed and Sealed this

Fifth Day of August, 2008

JON W. DUDAS
*Director of the United States Patent and Trademark Office*